C. PLAGGE.
ICE MACHINE.
No. 4,525.
REISSUED AUG. 22, 1871.
2 Sheets-Sheet 1.
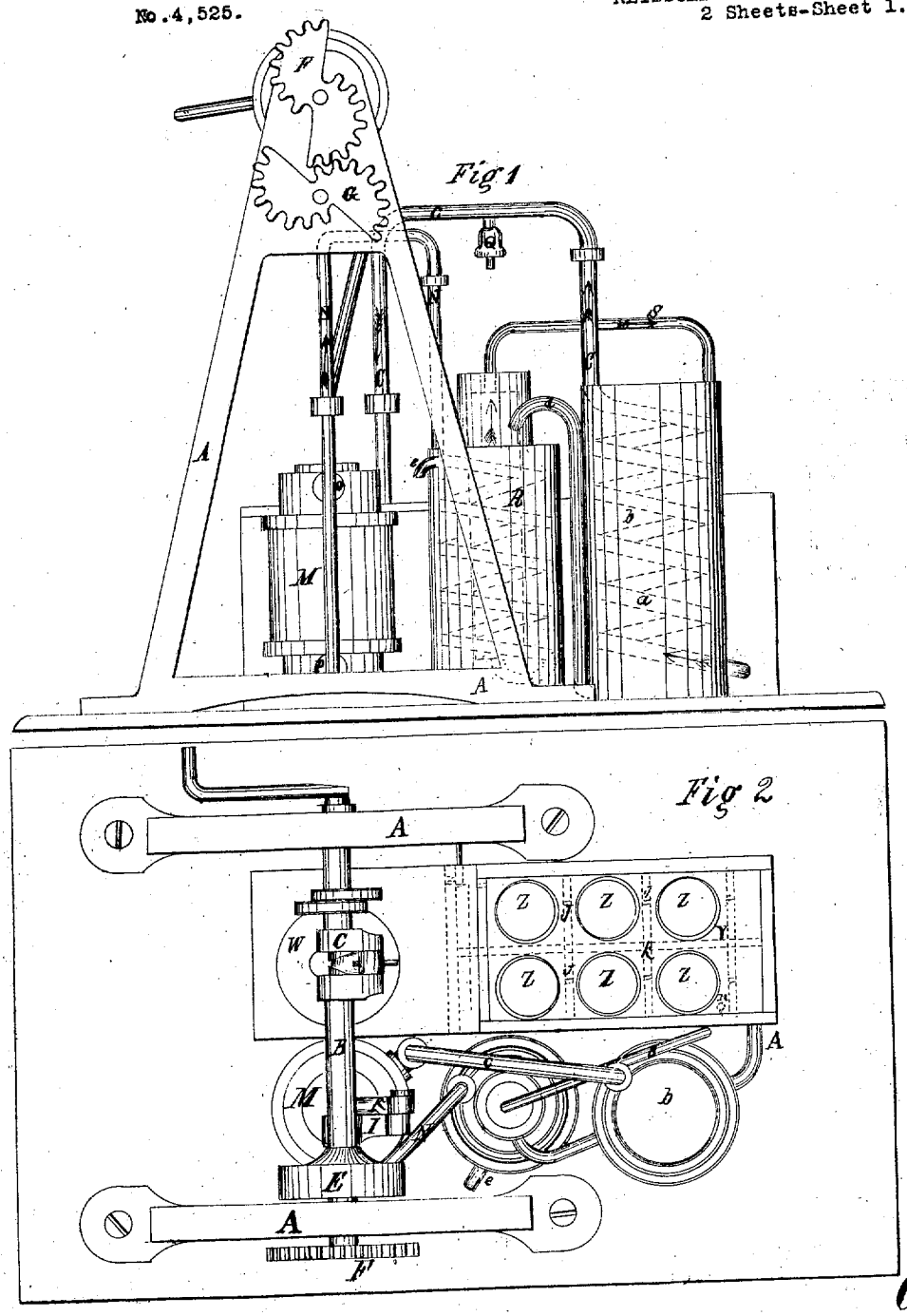
Witnesses.
Geo. W. Rothwell
H. C. Dodge
Inventor.
Charles Plagge.
By
Daniel Breed Atty

C. PLAGGE.

ICE MACHINE.

No. 4,525.

REISSUED AUG. 22, 1871.
2 Sheets-Sheet 2.

Inventor.

Charles Plagge.

By Daniel Breed Atty

Witnesses.

Geo. W. Rothwell

Wile. Dodge

UNITED STATES PATENT OFFICE.

CHARLES PLAGGE, OF NEW YORK, N. Y., ASSIGNOR TO HIMSELF AND THEODORE C. GLAZIER.

IMPROVEMENT IN ICE-MACHINES.

Specification forming part of Letters Patent No. 106,722, dated August 23, 1870; reissue No. 4,525, dated August 22, 1871.

*To all whom it may concern:*

Be it known that I, CHARLES PLAGGE, of the city, county, and State of New York, have invented a new and useful Improvement in Ice-Machines; and I do hereby declare that the following is a full and exact description thereof, reference being had to the accompanying drawing and to the the letters of reference marked thereon.

Figure 3:
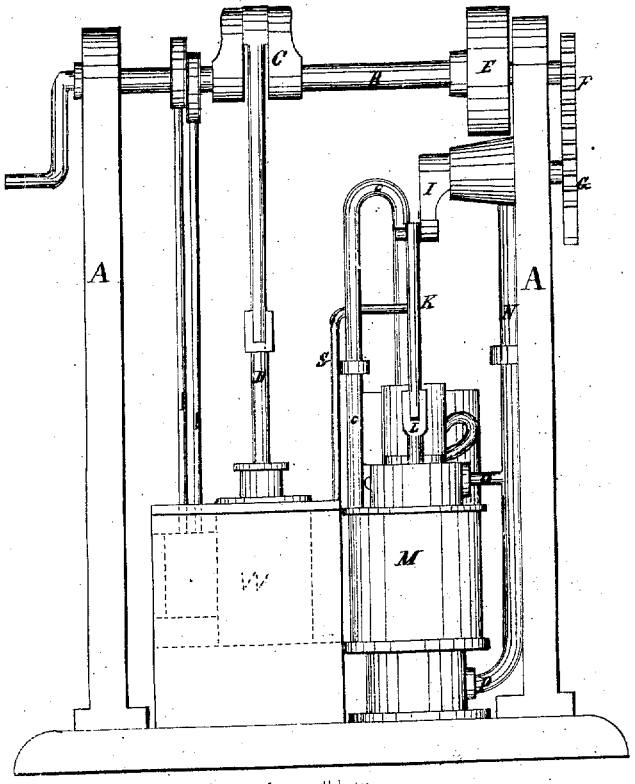
Figure 4:
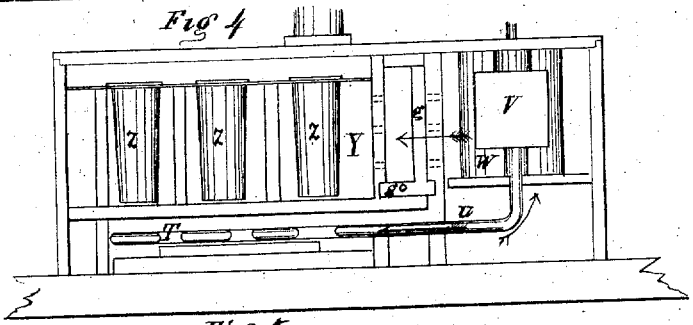
Figure 5:
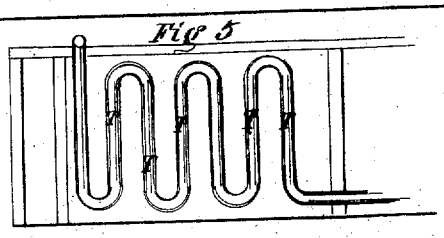

In the accompanying drawing, Figure 1 is a side view of my improved ice-machine. Fig. 2 is a plan of the same. Fig. 3 is an end view. Fig. 4 is a side view of the congelator. Fig. 5 is a plan of the coil of pipes through which the cold air passes, between the two bottoms of the congelator, to the cut-off and expansion-engine.

My invention relates to that class of ice-machines in which cold is produced by the alternate compression and expansion of atmospheric air. The chief object of my invention is to equalize the power required for compressing the air. This object I have accomplished by working one or more air-compressing pumps by means of differential gearing, which is so arranged that while the driving-shaft and pulley revolve at a uniform speed the piston of the air-compressing pump moves at the commencement of its stroke with a quicker motion than toward the end of its stroke, where more power is required. Another object is to apply the expansive force of the compressed air to the air-expanding engine when the piston of the air-compressing pump is toward the end of the stroke and requires the greatest power. My invention consists: First, in the application of mechanical power to an ice-machine in such manner that the greatest power, or an increased power at the point of greatest resistance in the stroke of the piston of the compressing-pump or engine, is secured. Second, in the combination of a differential gearing, or its equivalent, with an air-compressing pump and an air-expanding engine. Third, in the combination of an adjustable cut-off with an air-expanding engine. Fourth, in applying the expansive force of the air to driving the machine when, and only when, the piston of the air-compressing pump is toward the end of its stroke, and requires the greatest power. Fifth, in a congelator divided into compartments, through which the cold air is passed, and may be directed in different ways at pleasure. Sixth, in a water-cooler provided with tubes and receiving the cold air from the congelator. Seventh, in the combination of an air-pump with the congelator for exhausting the air from the water intended to be frozen; and eighth, in making ice-cream and various ices directly by the use of atmospheric air without the use of ice.

In the drawing, A represents the frame which supports the main shaft B, provided with a crank, C, for working the piston D of the air-expanding engine, and with a driving-pulley, E, which may be connected with a steam-power or other suitable power for driving the machine. The shaft B carries a differential gear, F, which engages with another differential gear, G, upon the short shaft H, which has a crank, I, connected with the rod K for working the piston L of the air-compressing pump M. By this arrangement of differential gear the greatest power is applied to the pump near the end of the piston-stroke, where the greatest force is required to move the piston.

The shaft B, being set in motion, works the piston L of the pump M, forcing the air into the pipe N through the two valves O and P, one of which receives the air at the downward stroke of the piston and the other at the upward stroke. Upon first charging the machine the additional air is received through the valve Q, Fig. 1, which also serves to admit additional air whenever the supply of air coming back from the congelator is insufficient for the successful operation of the machine. The air being forced into the pipe N passes directly to a coil of this pipe in the cooler R, which is filled with water. Thus cooled, the air passes, by pipe S, to the zigzag pipe T between the two bottoms of the congelator, and then, by pipe U, to to the valve-chest of the air-expanding engine. From this chest the condensed and cooled air enters the expansion-cylinder W, where it is suddenly expanded and cooled to the greatest extent. A pump, *f*, upon the congelator is employed for pumping the air from the water-vessels, and thus preventing bubbles in the ice. The air, after its expansion in cylinder W, escapes through the openings *j j* of the partitions *k k* which separate the air-engine from the congelator Y containing the freezing-vessels Z Z. By means of valves in the partitions of the congelator the admission of cold air from cylinder W is so regulated that it enters first that compartment of the congelator Y containing the freezing-vessels already longest exposed to the current of cold air, and from this compartment, having surrounded successively the vessels contained in it, passes to the other compartments until it reaches the openings *n* in the false bottom of the congelator, through which it passes into the space surrounding the pipes T, and finally passing from the congelator, by the the tube *a*, through the coil in the cooler *b b;* then, by the tube *c*, back to the pump M. In order to use to the best advantage the expansive force of the air admitted to the expansion-cylinder W an adjustable cut-off is provided in the valve-chest V and worked by eccentrics on the main shaft. The motion of this expansion-engine is so adjusted that, propelled by the admission of compressed air to its cylinder, it begins its stroke when the piston of the compressing-pump M has passed the center of its stroke, and the power required for its movement rapidly increases. When the piston of the compressing-pump is near the end of its stroke the condensed air is cut off from the expansion-engine, and the stroke is finished by the air already admitted working expansively.

It is evident that by thus regulating and combining the air-expanding engine provided with variable cut-off with one or more air-expanding pumps the expansive force of the compressed air is used in the most effective way to economize the power required for producing cold; and I consider the arrangement and combination, substantially as described, an important part of my invention.

As the volume of compressed air is in inverse proportion to the pressure to which it is subjected in the condensing-pump, the adjustable cut-off, which regulates the quantity of compressed air used in the expansion-cylinder, also regulates the pressure under which the air is compressed in the condensing-pump.

The air-expanding engine is surrounded by a box or some suitable non-conducting material.

My machine may be employed also for making ice-cream and the ices direct without the use of ice, the cream or other liquid to be frozen being placed in the freezing-vessels; and it may also be used for cooling buildings or vessels, or for other purposes, in which case a system of pipes may be substituted for the freezing-vessels.

I do not confine my invention to the precise construction above described. Practical experience may require the parts to be somewhat varied. Any arrangement of differential gearing may be employed, or any suitable mechanical means for applying to the compression-pump the greatest or an increased power at the point of greatest resistance in the stroke of the piston, and other changes may be made without departing from my invention, so long as the machine is substantially the same or produces substantially the same effects or results herein set forth.

Having thus described my invention, I claim, as an improvement in ice-machines—

1. The combination of the differential gearing, or its equivalent, with a condensing-pump or engine for the purpose of applying the greatest power or an increased power at the point of the greatest resistance in the stroke of the compressing piston, substantially as set forth.

2. The combination of a differential gearing, or its equivalent, with an expansion-engine, substantially as set forth.

3. An adjustable cut-off, in combination with an air-expansion engine, substantially as set forth.

4. The rod K, the crank I, or their equivalents, by means of which the air-expanding engine is connected with the driving-shaft and differential gearing, or its equivalent, to work the air-compressing pump or engine, substantially as set forth.

5. The above-described arrangement for regulating the air-expanding engine and its adjustable cut-off in order to equalize the power required for compressing the air as far as possible and to obtain the greatest effect of the power reproduced by the expanding air, substantially as set forth.

CHARLES PLAGGE.

Witnesses:

THEO. C. GLAZIER,
DANIEL BREED.